United States Patent
Shaheen (10) Patent No.: US 8,526,952 B2
(45) Date of Patent: Sep. 3, 2013

(54) METHOD AND APPARATUS FOR SUPPORTING HANDOFF FROM GPRS/GERAN TO LTE EUTRAN

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1144 days.

(21) Appl. No.: 12/029,505

(22) Filed: Feb. 12, 2008

(65) Prior Publication Data

US 2008/0268846 A1    Oct. 30, 2008

Related U.S. Application Data

(60) Provisional application No. 60/889,353, filed on Feb. 12, 2007.

(51) Int. Cl.
*H04W 36/00* (2009.01)
*H04W 4/00* (2009.01)
*H04M 1/00* (2006.01)
*H04L 12/28* (2006.01)

(52) U.S. Cl.
USPC ............... 455/436; 455/552.1; 455/553.1; 370/331; 370/328; 370/351

(58) Field of Classification Search
USPC   455/432.1–453, 552.1, 553.1; 370/328–334, 370/310, 315–316, 341, 351
See application file for complete search history.

(56) References Cited

U.S. PATENT DOCUMENTS

| | | | |
|---|---|---|---|
| 6,901,257 | B2 | 5/2005 | Kubota |
| 6,968,190 | B1* | 11/2005 | Suumaki et al. ............... 455/436 |
| 7,664,501 | B2 | 2/2010 | Dutta et al. |
| 2005/0143072 | A1 | 6/2005 | Yoon et al. |
| 2006/0276190 | A1 | 12/2006 | Shaheen |
| 2007/0021120 | A1* | 1/2007 | Flore et al. ..................... 455/436 |
| 2007/0036109 | A1 | 2/2007 | Kwak et al. |
| 2008/0153454 | A1* | 6/2008 | Haapapuro et al. ........ 455/404.1 |

FOREIGN PATENT DOCUMENTS

| | | |
|---|---|---|
| EP | 1 592 275 | 11/2005 |
| JP | 2006-304118 | 11/2006 |
| WO | 01/67788 | 9/2001 |
| WO | 2007/007990 | 1/2007 |
| WO | 2007/015068 | 2/2007 |

OTHER PUBLICATIONS

Third Generation Parnterhip Project, "Technical Specification Group Services and System Aspects; General Packet Radio Service (GPRS) enhancements for Evolved Universal Terrestrial Radio Acces Network (E-UTRAN) Access (Release 8)", 3GPP TS 23.401 V8.0.0 (Dec. 2007).

(Continued)

*Primary Examiner* — Wesley Kim
(74) *Attorney, Agent, or Firm* — Volpe and Koenig, P.C.

(57) ABSTRACT

A method and apparatus for supporting a handoff (HO) from a general packet radio service (GPRS), global system for mobile communication radio access network (GERAN), and long term evolution (LTE) evolved universal terrestrial radio access network (EUTRAN) includes receiving an LTE measurement report. An HO is initiated to the LTE network and a relocation request signal is transmitted. A relocation command signal that includes an evolved Node-B (eNB) identifier (ID) is received.

8 Claims, 11 Drawing Sheets

(56) References Cited

OTHER PUBLICATIONS

Third Generation Parnterhip Project, "Technical Specification Group Services and System Aspects; 3GPP System Architecture Evolution: GPRS enhancements for LTE access (Release 8)", 3GPP TS 23.401 V0.1.0 (Jan. 2007).

Third Generation Parnterhip Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.0.0 (Dec. 2007).

Third Generation Parntership Project, "Technical Specification Group Radio Services and System Aspects; General Packet Radio Service (GPRS); Service description; Stage 2 (Release 7)", 3GPP TS 23.060 V7.3.0 (Dec. 2006).

Third Generation Parntership Project, "Technical Specification Group Radio Services and System Aspects; General Packet Radio Service (GPRS); Service description; Stage 2 (Release 7)", 3GPP TS 23.060 V7.6.0 (Dec. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN) Radio interface protocol aspects (Release 7)," 3GPP TR 25.813 V7.1.0 (Sep. 2006).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.7.0 (Dec. 2006).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.23.0 (Dec. 2007).

Siemens, "Non-realtime support for GERAN towards LTE handovers," 3GPP Workshop on LTE-GSM Handovers, LGW-070013 (Jan. 10-11, 2007).

Third Generation Parnterhip Project, "Technical Specification Group Services and System Aspects; 3GPP System Architecture Evolution; GPRS enhancements for LTE access (Release 8)", 3GPP TS 23.401 V0.1.0 (Jan. 2007).

Third Generation Parnterhip Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.0.0 (Dec. 2007).

Third Generation Parntership Project, "Technical Specification Group Radio Services and System Aspects;General Packet Radio Service (3PRS); Service description; Stage 2 (Release 7)", 3GPP TS 23.060 V7 3.0 (Dec. 2006).

Third Generation Parntership Project, "Technical Specification Group Radio Services and System Aspects;General Packet Radio Service (GPRS); Service description; Stage 2 (Release 7)", 3GPP TS 23.060 V7.6.0 (Dec. 2007).

Third Generation Partnership Project, "Technical Specification Group Radio Access Network; Evolved Universal Terrestrial Radio access (E-UTRA) and Evolved Universal Terrestrial Radio Access Network (E-TRAN) Radio interface protocol aspects (Release 7)," 3GPP TR 25.813 V7.1.0 (Sep. 2006).

Third Generation Partnership Project, "Technical Specification Group GSM/EDGE Radio Access Network; Mobile radio interface layer 3 specification, Radio Resource Control (RRC) protocol (Release 4)," 3GPP TS 44.018 V4.23.0 (May 2006).

Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.22.0 (May 2006).

Third Generation Partnership Project, "Technical Specification Group GSM/EDGE Radio Access Network; Mobile radio interface layer 3 specification; Radio Resource Control (RRC) Protocol (Release 8)," 3GPP TS 44.018 V8.1.0 (Dec. 2007).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.11.0 (Dec. 2007).

Third Generation Partnership Project, "Technical Specification Group GSM/EDHE Radio Access Network; Mobile radio interface layer 3 specification; Radio Resource Control (RRC) protocol (Release 7)," 3GPP TS 44.018 V7.7.0 (Dec. 2006).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.11.0 (Dec. 2007).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.20.0 (Dec. 2006).

Third Generation Partnership Project, "Technical Specification Group Radio Access Network; Evolved Universal Terrestrial Radio access (E-UTRA) and Evolved Universal Terrestrial Access Network (E-TRAN); S1 Application Protocol (S1AP) (Release 8)," 3GPP TS 36.413 V0.0.0 (Jan. 2007).

Third Generation Partnership Project, "Technical Specification Group Radio Access Network; Evolved Universal Terrestrial Access Network (E-UTRAN); S1 Application Protocol (S1AP) (Release 8)," 3GPP TS 36.413 V8.0.0 (Dec. 2007).

* cited by examiner

METHOD AND APPARATUS FOR SUPPORTING HANDOFF FROM GPRS/GERAN TO LTE EUTRAN

CROSS REFERENCE TO RELATED APPLICATIONS

This application claims the benefit of U.S. Provisional Application No. 60/889,353, filed Feb. 12, 2007, which is incorporated by reference as if fully set forth.

FIELD OF INVENTION

This application is related to wireless communications.

BACKGROUND

There are different types of wireless communication systems. For example, some wireless communication systems include general packet radio service (GPRS), global system for mobile communication radio access network (GERAN), and long term evolution (LTE) evolved universal terrestrial radio access network (EUTRAN).

When a mobile unit is traveling, it may need to be handed off from one network to another. Since not all networks are identical, a method for supporting the handoff between systems would be beneficial.

SUMMARY

A method and apparatus for supporting handoff from GPRS/GERAN to LTE EUTRAN are disclosed. The method includes receiving an LTE measurement report. An HO is initiated to the LTE network and a relocation request signal is transmitted. A relocation command signal that includes an evolved Node-B (eNB) identifier (ID) is received.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, base station controller, an access point (AP), or any other type of interfacing device capable of operating in a wireless environment.

Figure 1:
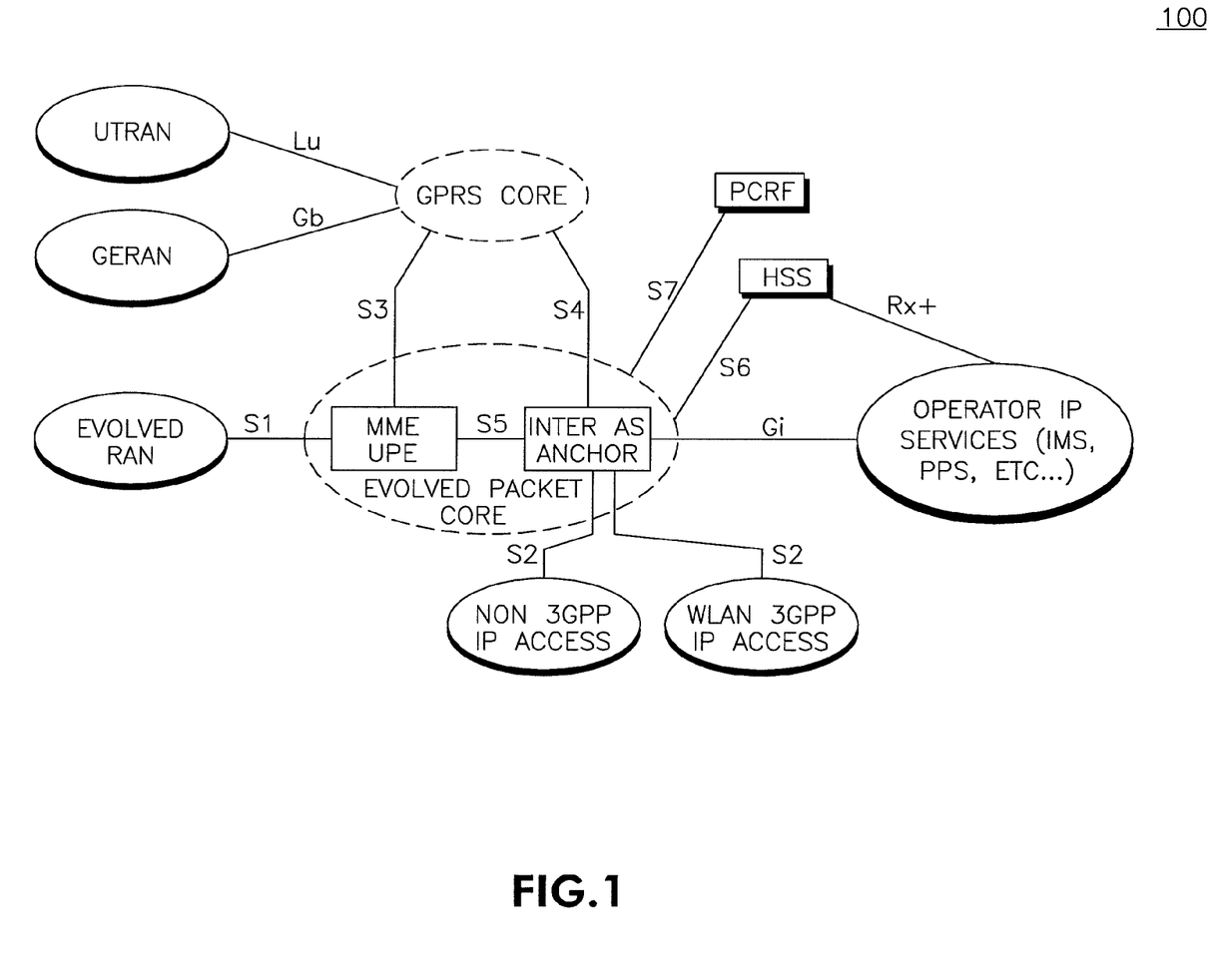
FIG. 1 shows an example general network architecture of an LTE system architecture.

FIG. 1 shows an example general network architecture of an LTE system architecture 100. The LTE system 100 shows the interworking between LTE system architecture with the existing GERAN, UTRAN, based GPRS Core. The LTE system includes an evolved radio access network (RAN) (E-Node B) connected to an evolved packet core containing a mobility management entity/user plane entity (MME/UPE), and inter AS anchor. The evolved packet core connects to an HSS, PCRF, HSS, operator IP servers, (e.g., IMS, PSS, and the like), a Non-3GPP IP Access network, and a wireless local area network (WLAN) 3GPP IP Access block. An operations IP server, (e.g., IMS, PSS, and the like) is also included in the LTE system 100. The GPRS Core contains the Serving GPRS Support Node (SGSN) which is responsible for mobility management, access procedures, and user plane control. It also contains the Gateway GPRS Support Node (GGSN) where the network is connected to external networks and other operator servers. The Operator IP Service includes the IP Multimedia Service Subsystem (IMS), where voice over IP (VoIP) and other multimedia services are controlled. The Non-3GPP IP access includes connections to other technologies such as 3GPP2 (CDMA2000) and WiMAX (e.g., IEEE 802.16 systems). The Evolved Core also connects to WLAN networks that are incorporated into 3GPP systems via interworking architecture defined in 3GPP.

Figure 2:
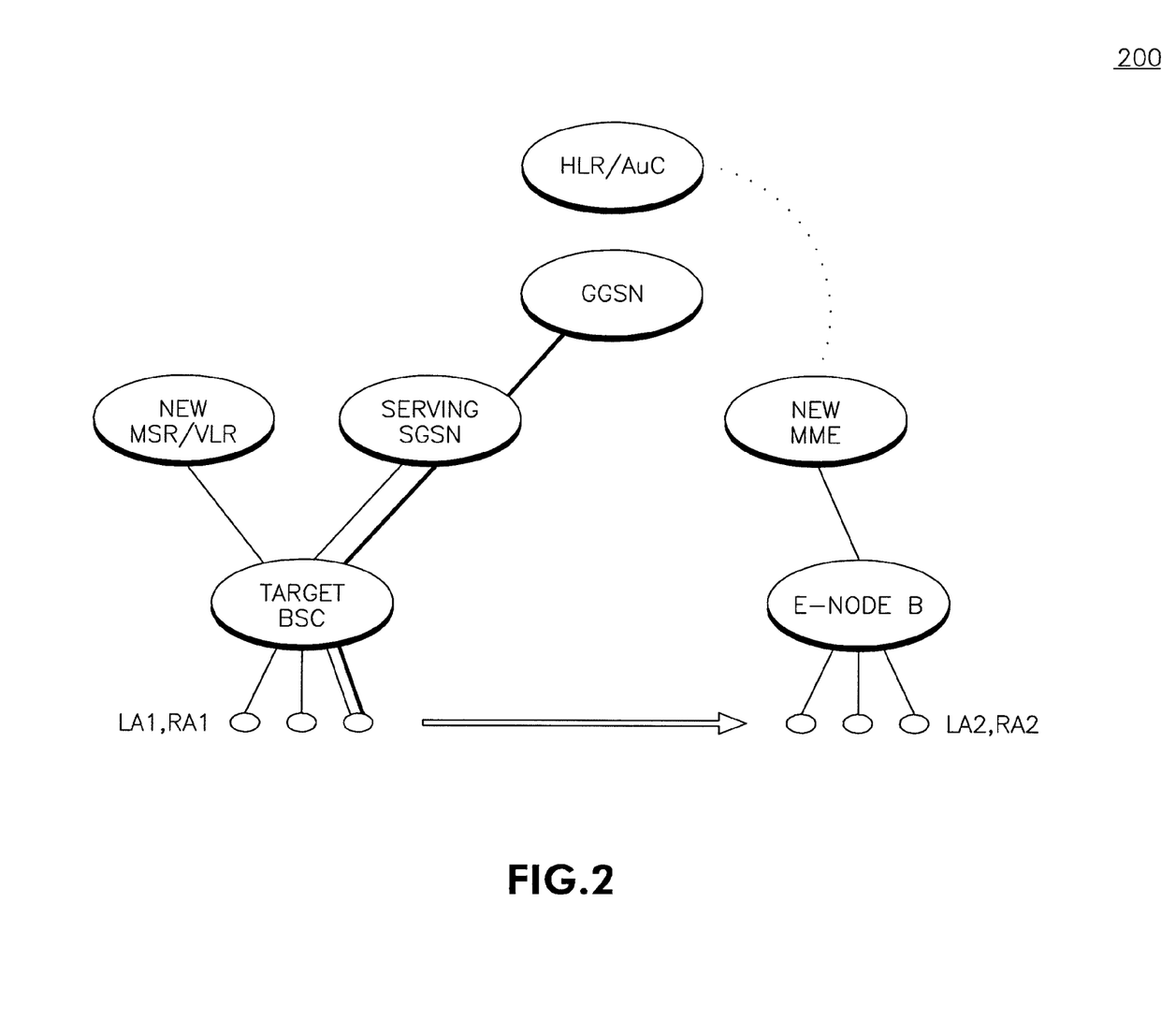
FIG. 2 shows an example first stage handoff procedure from a GERAN system to an LTE system.

FIG. 2 shows an example first stage handoff procedure 200 where a WTRU is transitioning from coverage within a GERAN system to coverage within an LTE system. As shown in FIG. 2, a WTRU, (depicted by the ovals shown at the bottom of the Figure), is being handed over from one system to the other. The WTRU is currently connected to a gateway GPRS support node (GGSN) via a serving GPRS support node (SGSN), and a target base station controller (BSC).

The cells belonging to GERAN systems may include different Location Areas/Routing Areas (LA1/RA1) from those belonging to LTE based cells (LA2/RA2). In certain deployments, although GERAN cells may be co-located with LTE cells, these cells may remain under different LA/RA configurations due to the differences between the two system architectures.

Figure 3:
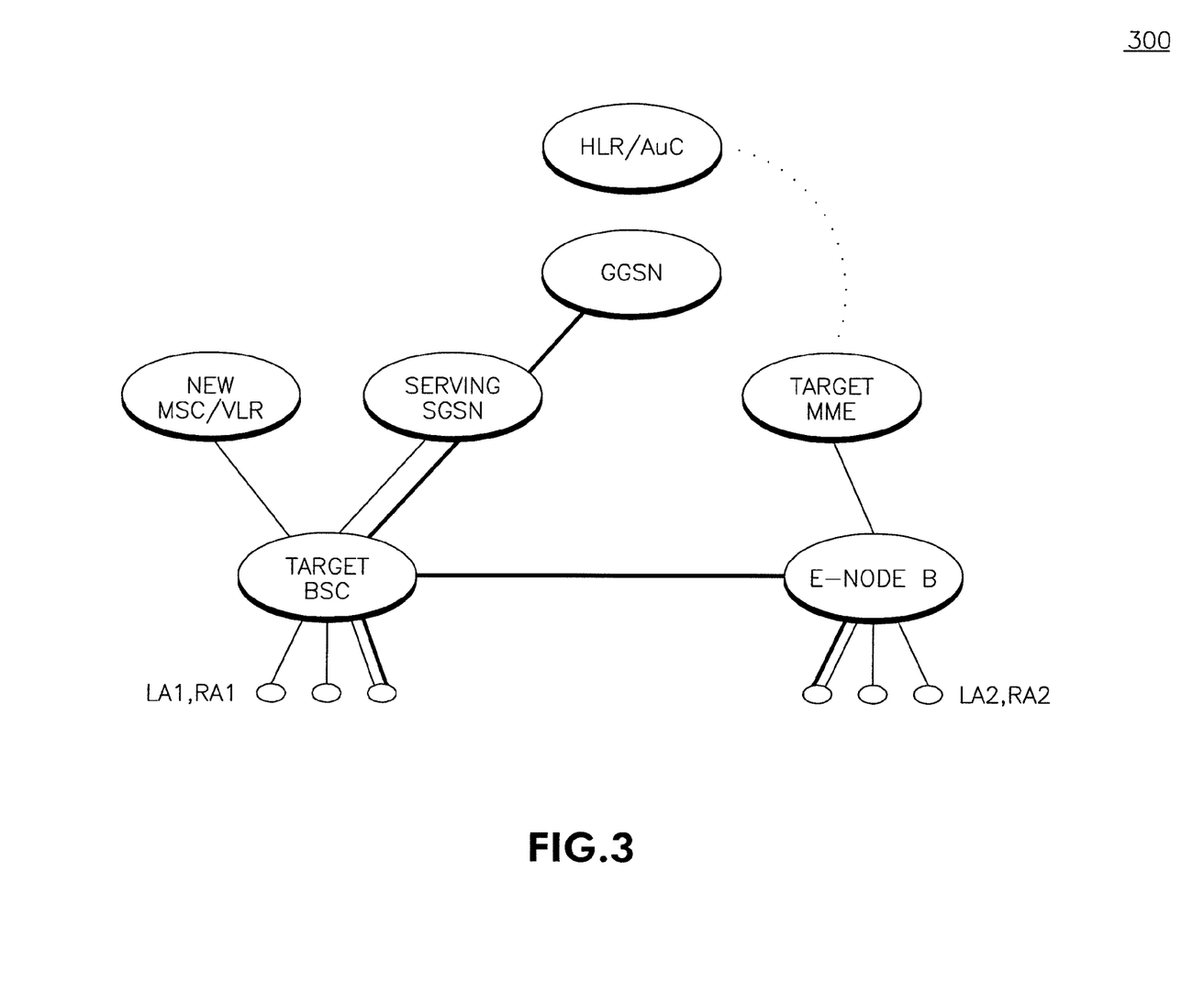
FIG. 3 shows an example second stage handoff procedure from a GERAN system to an LTE system.

FIG. 3 shows an example second stage handoff procedure 300 from a GERAN system to an LTE system, that may be utilized optionally. A tunnel may be created between the target BSC and an evolved Node B as the WTRU is handed off from one system to another. The tunnel temporarily forwards the current pending data transfer between the GERAN system and the WTRU via the eNode-B while the new connection through the Evolved Core Network is being established. This should ensure that no data is lost during transition. The operator may chose not to implement this step and go to a complete transition case where no connection is established between a GERAN BSC and eNode-B. Forwarding of data can occur at higher layers between the two core networks.

Figure 4:
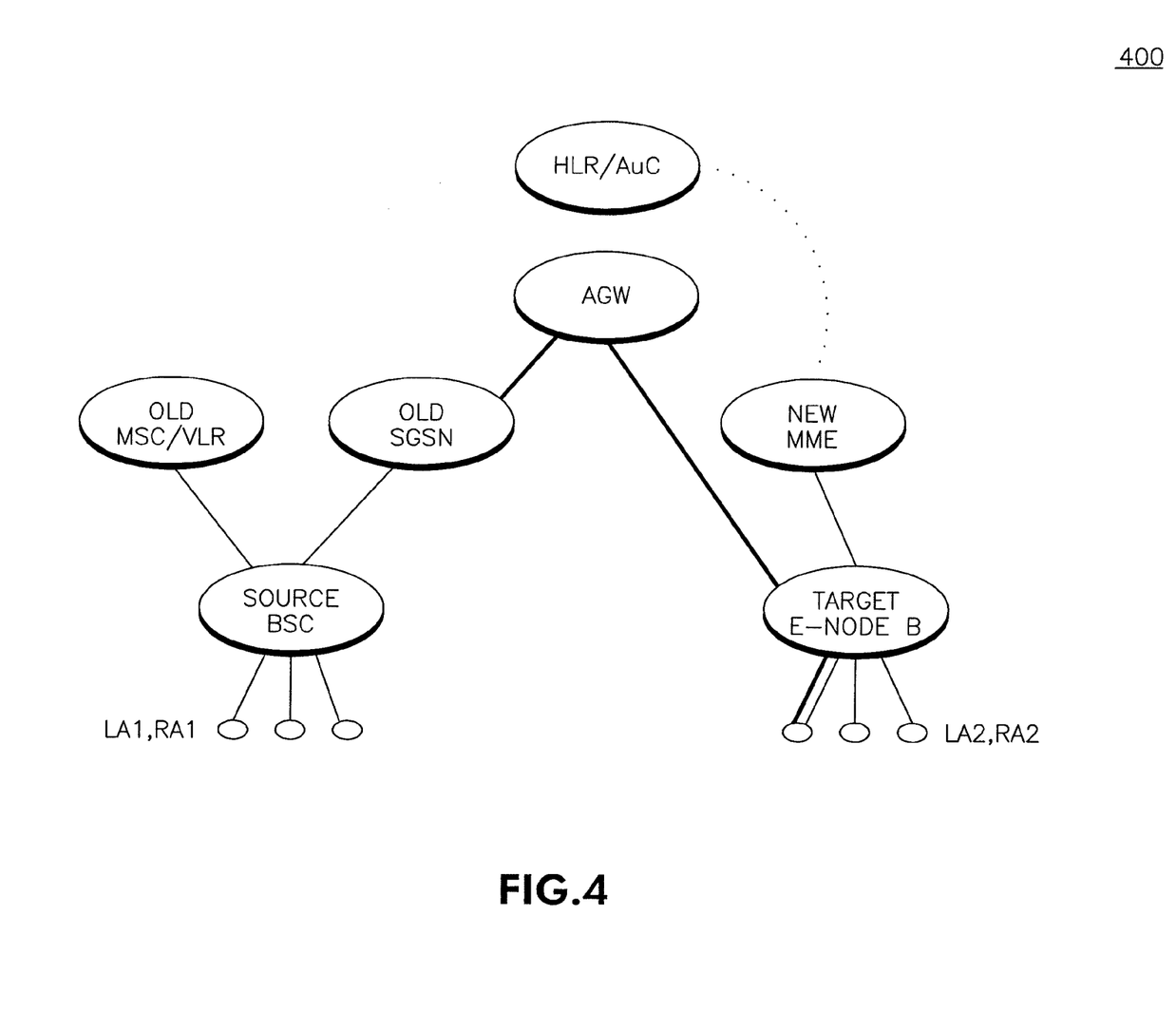
FIG. 4 shows an example third stage handoff procedure from a GPRS/GERAN system to an LTE system.

FIG. 4 shows an example third stage handoff procedure 400 from a GPRS/GERAN system to an LTE system. As shown in FIG. 4, the WTRU is now connected to an access gateway (AGW) via a new MME and target E-Node B.

Figure 5:
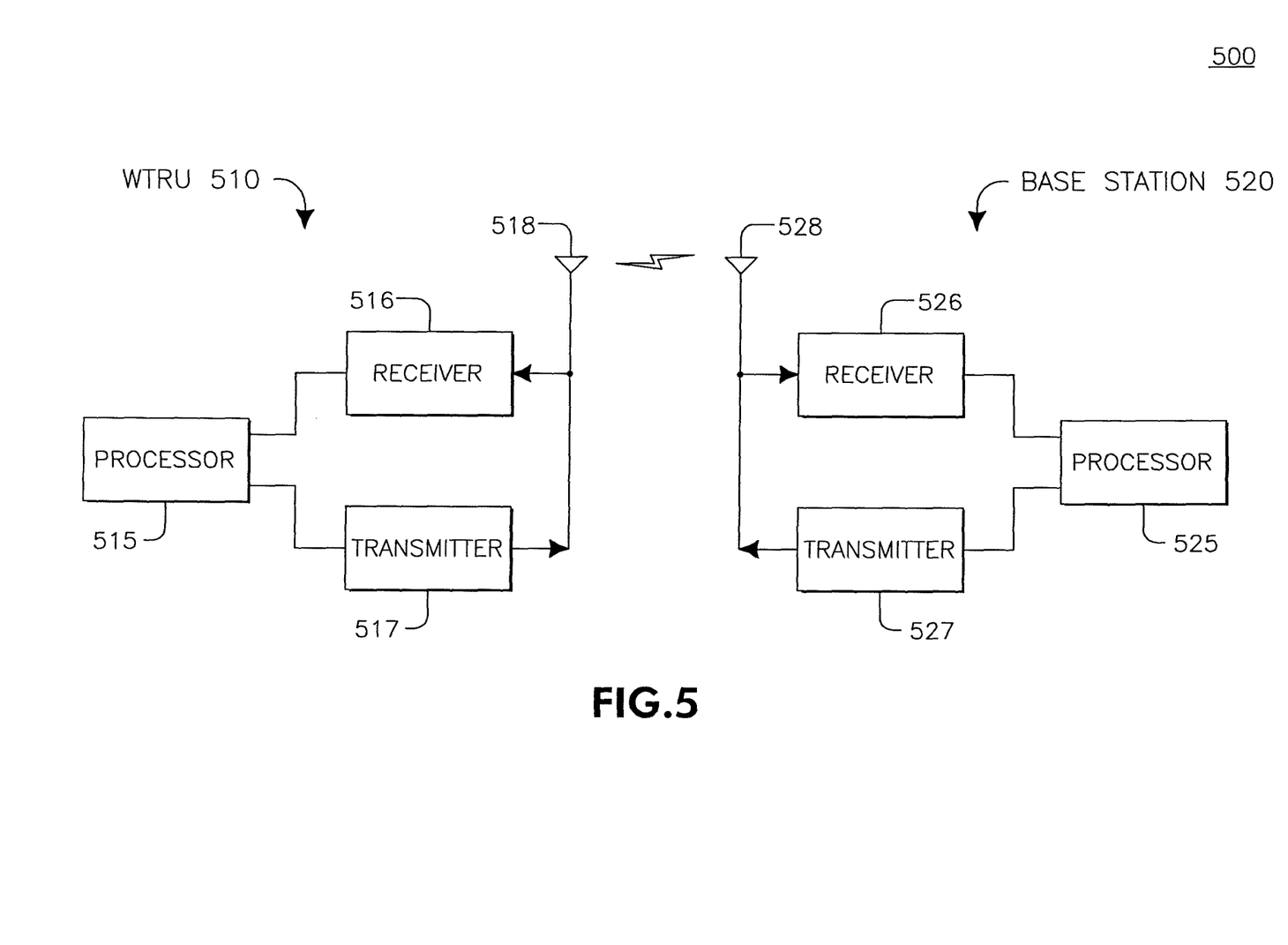
FIG. 5 is a functional block diagram of a wireless transmit/receive unit and a base station.

FIG. 5 is a functional block diagram of a WTRU 510 and a base station 520. As shown in FIG. 5, the WTRU 510 is in communication with the base station 520 and both are configured to support handoff from GPRS/GERAN to LTE EUTRAN.

In addition to the components that may be found in a typical WTRU, the WTRU 510 includes a processor 515, a receiver 516, a transmitter 517, and an antenna 518. The processor 515 is configured to support handoff from GPRS/GERAN to LTE EUTRAN. The receiver 516 and the transmitter 517 are in communication with the processor 515. The antenna 518 is in communication with both the receiver 516 and the transmitter 517 to facilitate the transmission and reception of wireless data. The processor 515, receiver 516, transmitter 517, and antenna 518 may be configured as a GPRS/GERAN radio transceiver, or configured as an LTE EUTRAN radio transceiver. Also, although only one processor, receiver, transmitter, and antenna is shown, it should be noted that multiple processors, receivers, transmitters, and antennas may be included in the WTRU 510, whereby different groupings of processors, receivers, transmitters, and antennas operate in different modes, (e.g., GPRS/GERAN transceiver or LTE EUTRAN tranceiver).

In addition to the components that may be found in a typical base station, the base station 520 includes a processor 525, a receiver 526, a transmitter 527, and an antenna 528. The processor 525 is configured to support handoff from GPRS/GERAN to LTE EUTRAN. The receiver 526 and the transmitter 527 are in communication with the processor 525. The antenna 528 is in communication with both the receiver 526 and the transmitter 527 to facilitate the transmission and reception of wireless data.

It should be noted that the WTRU 510 and base station 520 may be in communication with other network devices.

Figure 6A:
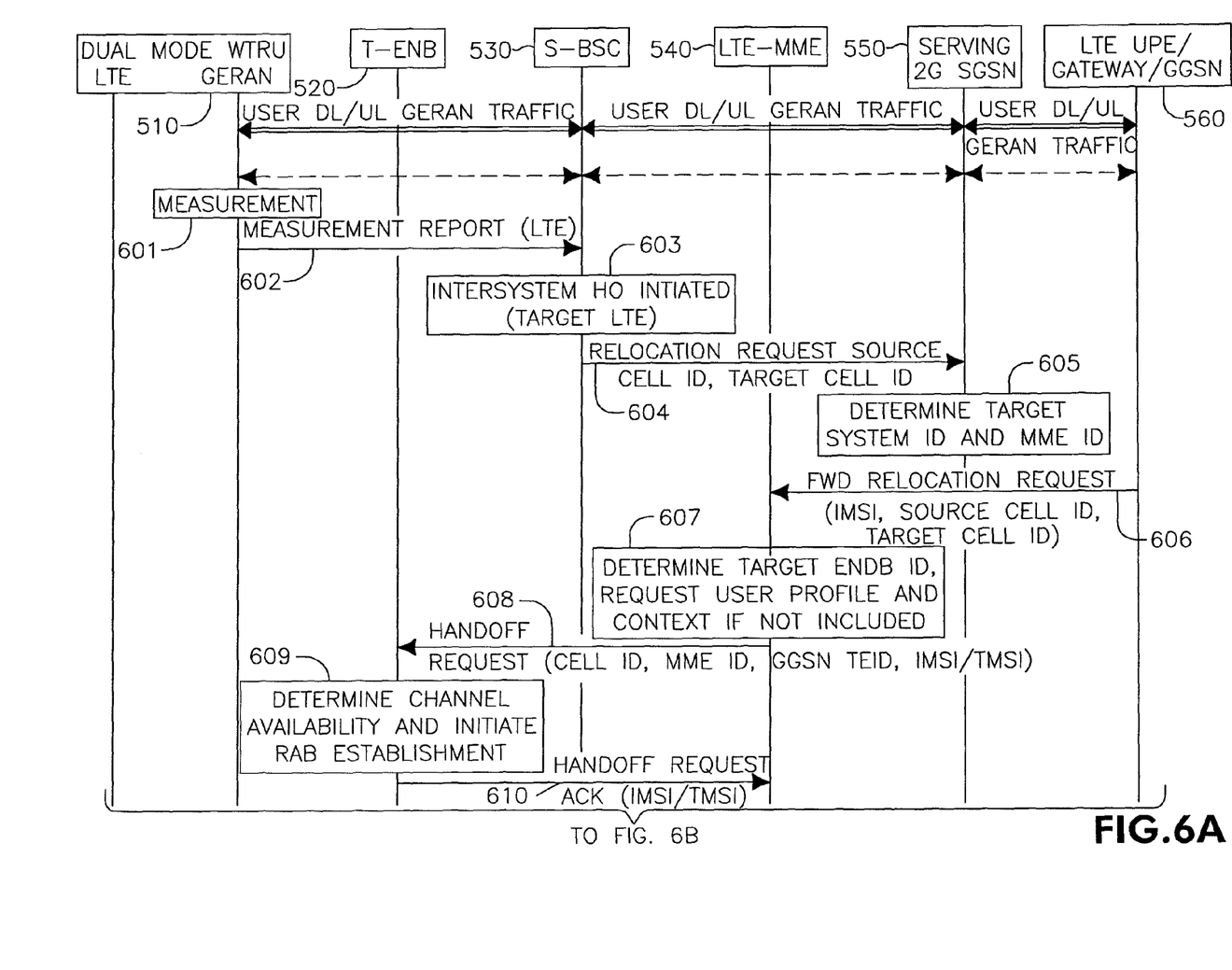
FIGS. 6A-6C show an example signal diagram of a handoff procedure.
Figure 6B:
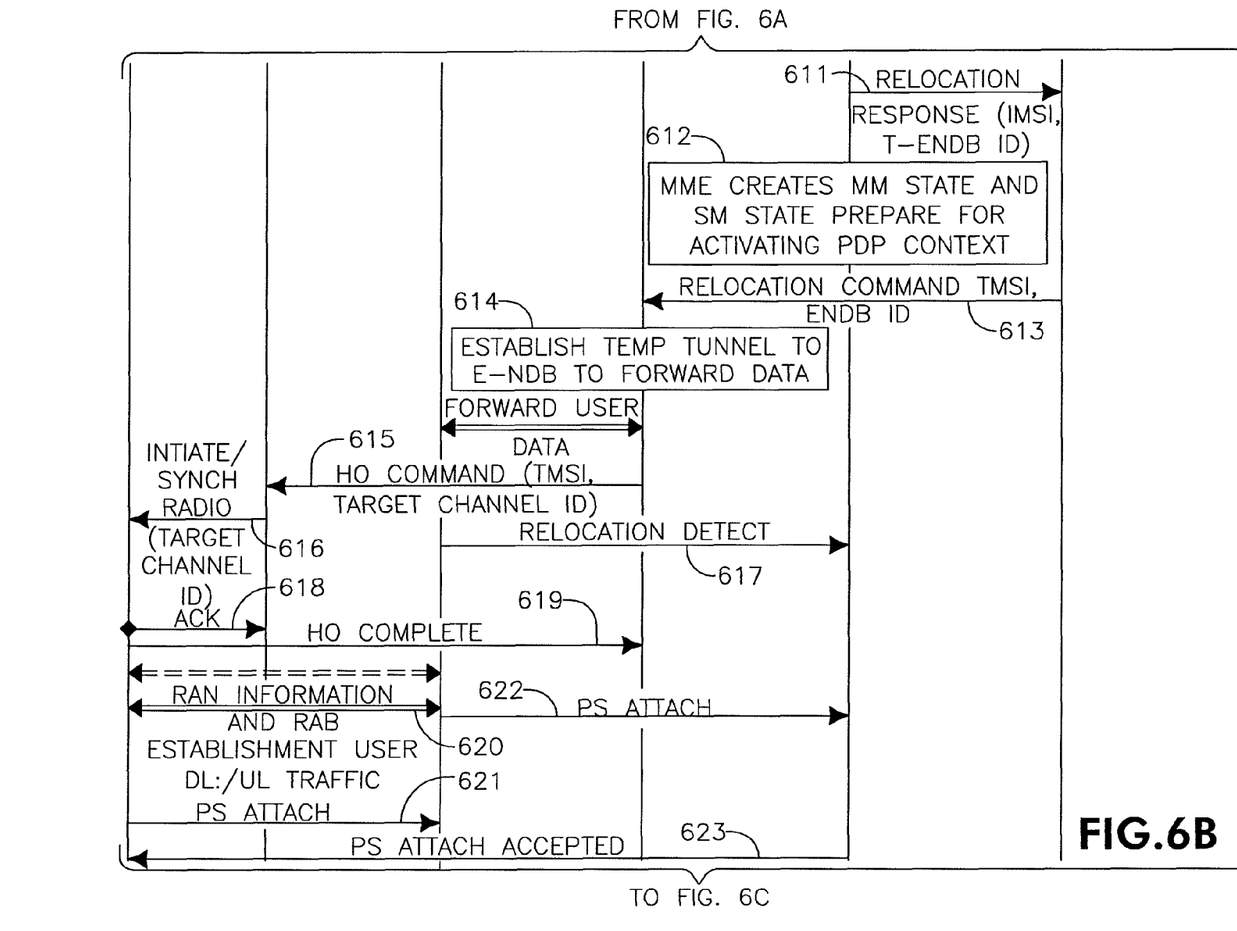
Figure 6C:
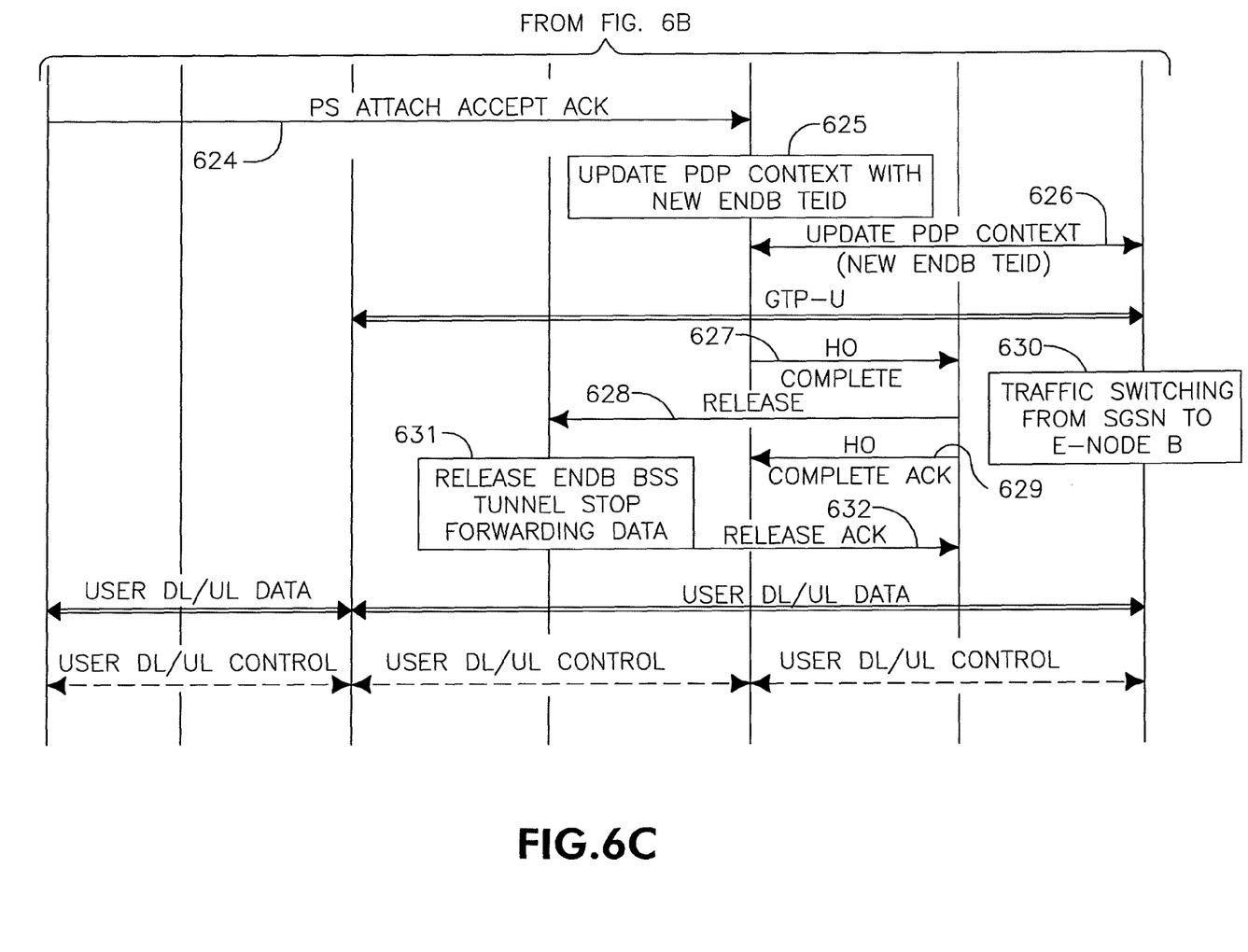

FIGS. 6A-6C show an example signal diagram of a handoff procedure 600. In the signal diagram of FIGS. 6A-6C, a dual mode WTRU (LTE/GERAN) 510 is shown, a target e-Node B (T-ENB) 520, a serving BSC (S-BSC) 530, an LTE-MME 540, a serving second generation (2G) SGSN 550, and an LTE UPE/Gateway/GGSN 560. The WTRU 510 includes an LTE and GERAN transceiver.

As shown in FIGS. 6A-6C, user downlink (DL) and uplink (UL) traffic is occurring between the entities and in the GERAN mode of the dual mode WTRU 510. In step 601, measurements are performed at the WTRU 510. In one example, the measurements are performed by the GERAN transceiver in the WTRU 510 on an LTE network. The WTRU 510 then transmits a measurement report (LTE) signal (602) to the S-BSC 530. Intersystem HO is initiated, with LTE being the target (step 603). A relocation request signal 604, containing the source cell ID and the target cell ID is transmitted from the S-BSC 530 to the serving 2G SGSN 550. The serving 2G SGSN determines the target system ID and the MME ID (step 605), and forwards the relocation request to the LTE-MME 540.

The LTE-MME 540 determines the target e-Node B ID, and requests the user profile and context if it was not included in signaling message 606 (step 607). The LTE-MME 540 sends a handoff request signal (608) to the T-ENB 520, containing the cell ID, MME ID, GGSN TEID, and the international mobile subscriber identity/temporary mobile subscriber identity (IMSI/TMSI). The T-ENB 520 determines channel availability and initiates radio access bearer (RAB) establishment (step 609). The T-ENB 520 transmits a handoff request ACK, (including the IMSI/TMSI), signal (610) to the LTE-MME 540, which transmits a relocation response signal 611, that includes the IMSI and T-E Node B ID to the serving 2G SGSN 550. The LTE-MME 540 then creates an MM state and SM state to prepare for activating packet data protocol (PDP) context information (step 612).

The serving 2G SGSN 550 transmits a relocation command signal (613), that includes the TMSI and E-Node B ID to the S-BSC 530, which establishes a temporary tunnel to the E-Node B to forward data (step 614). User data is then forwarded between the T-ENB 520 and the S-BSC 530, and the HO command 615 is transmitted from the T-ENB 520 to the GERAN transceiver of the WTRU 510, which transmits an initiate/synch radio signal (616), which includes the target channel ID, to the LTE transceiver. The T-ENB 520 sends a relocation detect signal (617) to the LTE-MME 540, and the LTE transceiver ACKs (618) the initiate/synch radio signal.

An HO complete signal (619) is sent from the GERAN transceiver to the S-BSC. RAN information and RAB establishment is performed between the LTE transceiver and the T-ENB 520 (620) and user DL/UL traffic flows. A PS attach signal (621) is transmitted from the LTE transceiver to the T-ENB 520, which forwards the signal to the LTE-MME 540 (622). The LTE-MME 540 transmits a PS attach accepted signal (623) to the LTE transceiver through the T-ENB 520, which responds with a PS attach accept ACK (624), which is forwarded to the LTE-MME 540 through the T-ENB 520.

The MME-LTE updates the PDP context with the new E-Node B TEID (step 625), and transmits an update PDP context signal (626) to the LTE UPE/Gateway/GGSN 560. Additionally, user data may be transmitted along a GPRS tunneling protocol user plane (GTP-U).

An HO complete signal (627) is sent from the LTE-MME 540 to the serving 2G SGSN 550, which sends a release signal (628) to the S-BSC 530 and an HO complete ACK (629) to the LTE-MME 540. Traffic is switched from the SGSN to the E-Node B (step 630) by the LTE UPE/Gateway/GGSN 560, and the S-BSC 530 releases the E-Node B BSS tunnel and stops forwarding data (step 631). A release ACK (632) is transmitted from the S-BSC 530 to the serving 2G SGSN 550, and user DL/UL data and control data proceeds between the LTE transceiver the T-ENB 520, and the LTE UPE/Gateway/GGSN 560.

Figure 7A:
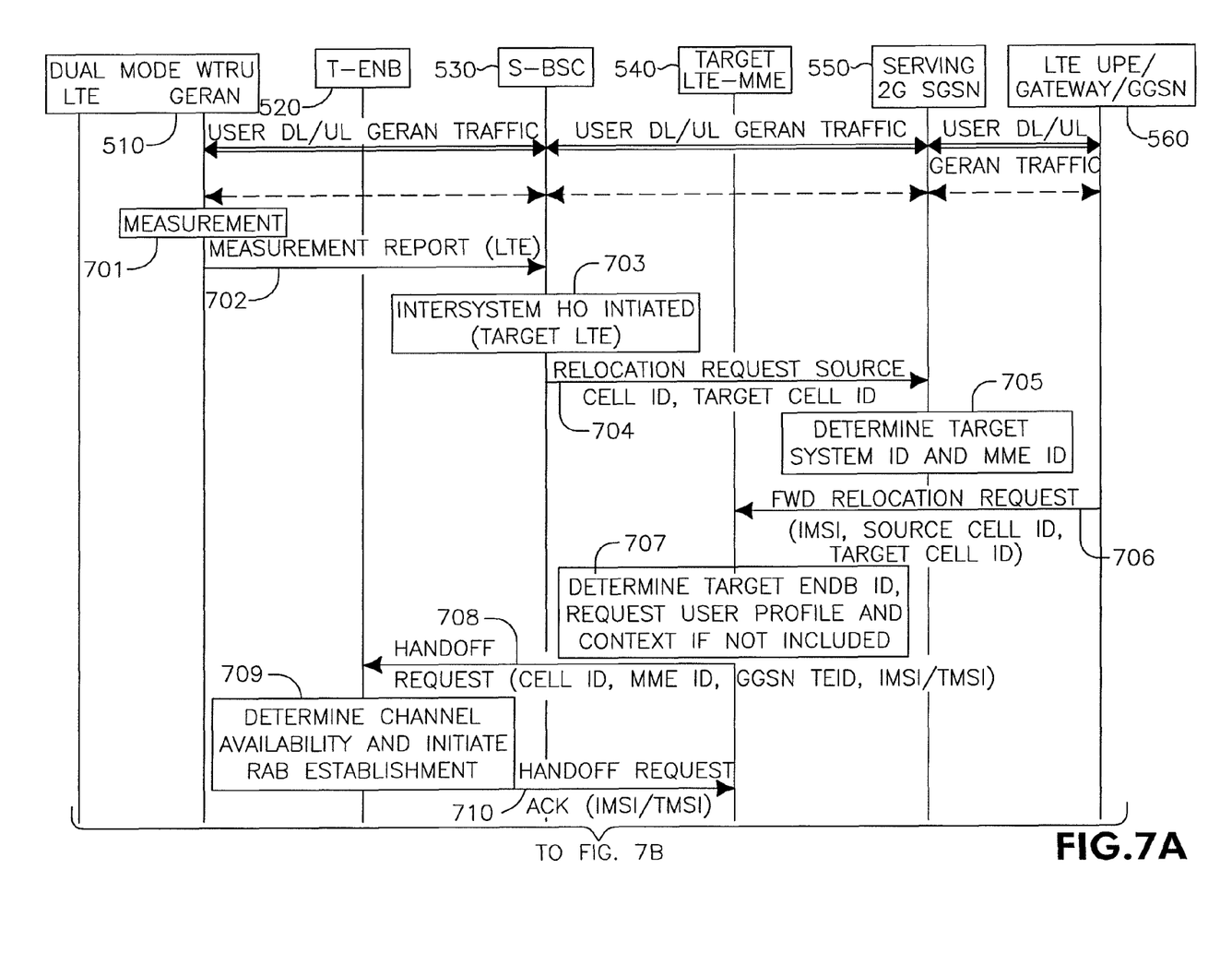
FIGS. 7A-7C show an example signal diagram of an alternative handoff procedure.
Figure 7B:
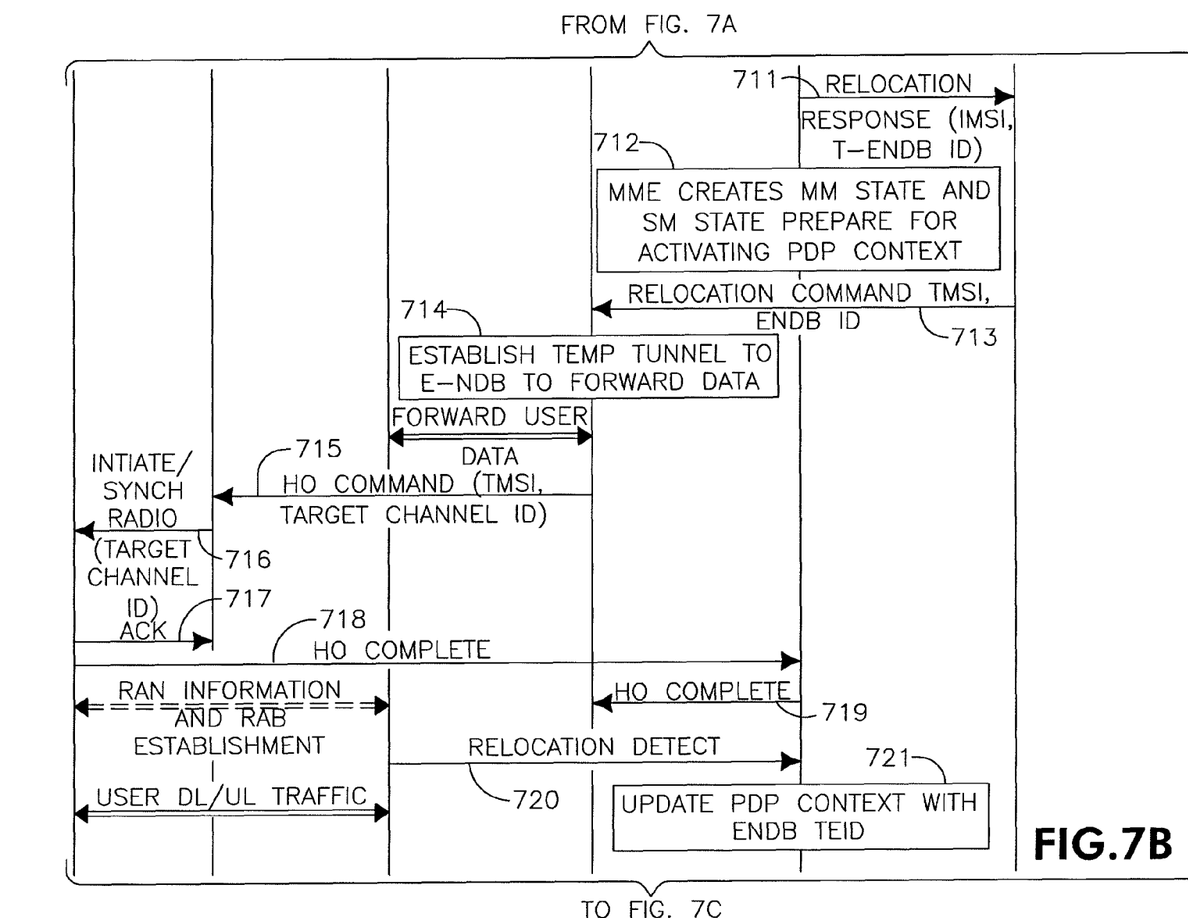
Figure 7C:
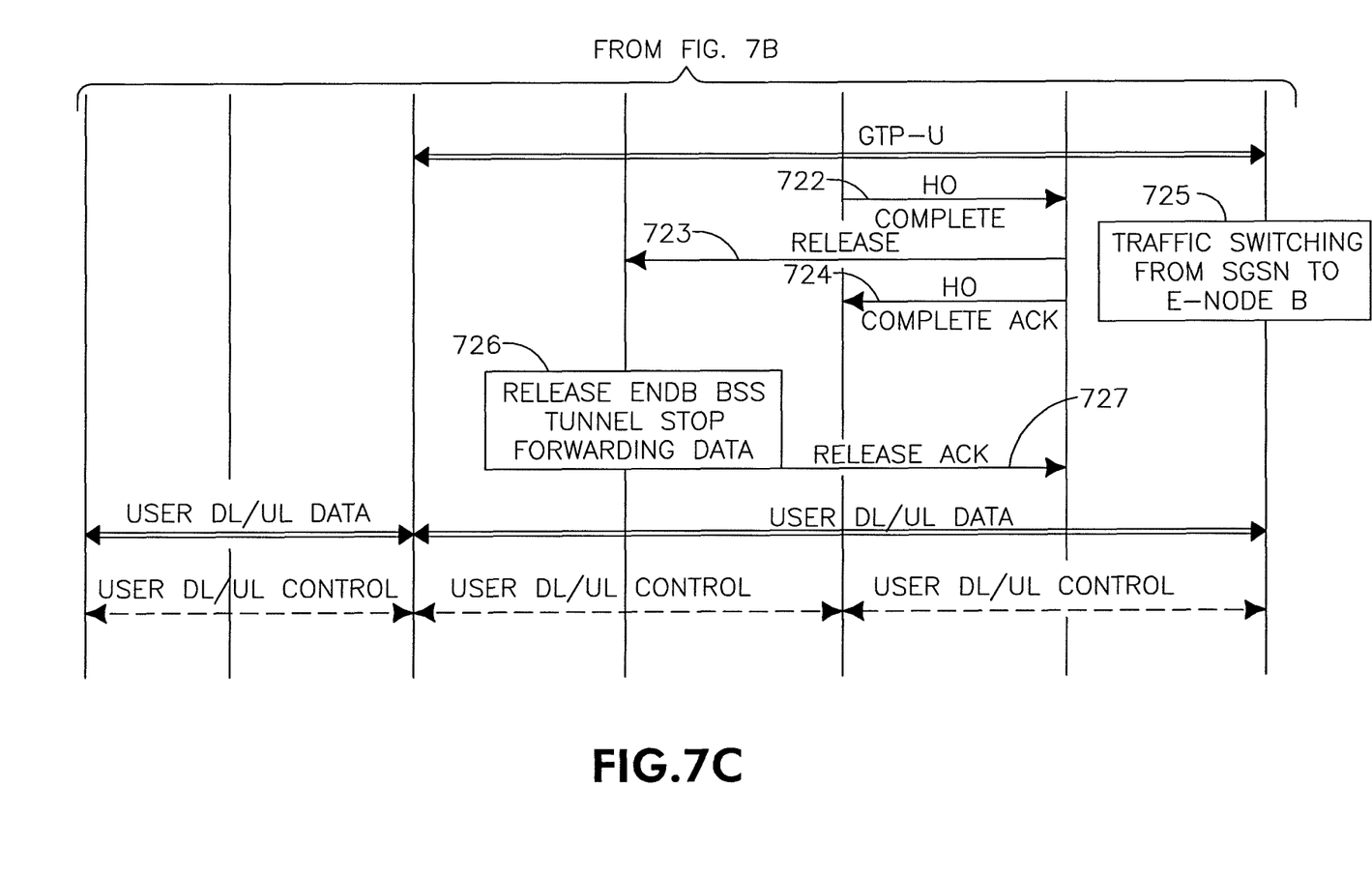

FIGS. 7A-7C show an example signal diagram of an alternative handoff procedure 700. As shown in FIG. 7A-7C, user downlink (DL) and uplink (UL) traffic is occurring between the entities and in the GERAN mode of the dual mode WTRU 510. In step 701, measurements are performed at the WTRU 510. The WTRU 510 then transmits a measurement report (LTE) signal (702) to the S-BSC 530. Intersystem HO is initiated, with LTE being the target (step 703). A relocation request signal 704, containing the source cell ID and the target cell ID is transmitted from the S-BSC 530 to the serving 2G SGSN 550. The serving 2G SGSN determines the target system ID and the MME ID (step 705), and forwards the relocation request to the LTE-MME 540.

The LTE-MME 540 determines the target e-Node B ID, and requests the user profile and context if it was not included in signaling message 706 (step 707). The LTE-MME 540 sends a handoff request signal (708) to the T-ENB 520, containing the cell ID, MME ID, GGSN TEID, and the international mobile subscriber identity/temporary mobile subscriber identity (IMSI/TMSI). The T-ENB 520 determines channel availability and initiates radio access bearer (RAB) establishment (step 709). The T-ENB 520 transmits a handoff request ACK, (including the IMSI/TMSI), signal (710) to the LTE-MME 540, which transmits a relocation response signal 711, that includes the IMSI and T-E Node B ID to the serving 2G SGSN 550. The LTE-MME 540 then creates an MM state and SM state to prepare for activating packet data protocol (PDP) context information (step 712).

The serving 2G SGSN 550 transmits a relocation command signal (713), that includes the TMSI and E-Node B ID to the S-BSC 530, which establishes a temporary tunnel to the E-Node B to forward data (step 714). User data is then forwarded between the T-ENB 520 and the S-BSC 530, and the HO command 715 is transmitted from the T-ENB 520 to the GERAN transceiver of the WTRU 510, which transmits an initiate/synch radio signal (716), which includes the target channel ID, to the LTE transceiver. An ACK (717) is sent from the LTE transceiver, and an HO complete message (718) is sent from the GERAN transceiver to the S-BSC 530, which forwards an HO complete signal (719) to the T-ENB 520. RAN and RAB establishment occurs between the LTE transceiver and the T-ENB 520, and the T-ENB 520 transmits a relocation detect message (720) to the LTE-MME 540.

User DL/UL traffic occurs between the LTE transceiver and the T-ENB 520. The MME-LTE updates the PDP context with the new E-Node B TEID (step 721).

An HO complete signal (722) is sent from the LTE-MME 540 to the serving 2G SGSN 550, which sends a release signal (723) to the S-BSC 530 and an HO complete ACK (724) to the LTE-MME 540. Traffic is switched from the SGSN to the E-Node B (step 725) by the LTE UPE/Gateway/GGSN 560, and the S-BSC 530 releases the E-Node B BSS tunnel and stops forwarding data (step 726). A release ACK (727) is transmitted from the S-BSC 530 to the serving 2G SGSN 550, and user DL/UL data and control data proceeds between the LTE transceiver the T-ENB 520, and the LTE UPE/Gateway/GGSN 560.

As described in FIGS. 1-7C above, radio resources are prepared in the target 3GPP access system before the WTRU 510 is commanded by the source 3GPP access system to change to the target 3GPP access system. A tunnel is established between the two radio access networks (RANs) (basic service set (BSS) and E-Node B) in order to forward the data while the core network resources are assigned.

A control interface may exist in the core level between the 2G/3G SGSN and corresponding MME to exchange the mobility context and the session context of the Mobile. Additionally, the target system may provide directions to the WTRU 510 as to the radio access requirements, such as the radio resource configuration, target cell system information, and the like.

There is an intermediate state during handoff where the DL U-plane data is sent from source system to the target system before the U-plane is switched directly to the target system in order to avoid the loss of user data, (e.g., by forwarding). Bi-casting may also be used until the 3GPP Anchor determines that it can send DL U-plane data directly to the target system.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in an evolved Node-B (eNB), the method comprising:
receiving a handover request message from a Long Term Evolution (LTE) Mobility Management Entity (MME), the handover request message including an identifier of a wireless transmit/receive unit (WTRU) to be handed over from GSM EDGE Radio Access Network (GERAN) technology to LTE technology;
establishing radio resources for the WTRU based on the handover request message;
communicating a handover request acknowledgement message to the MME;
establishing a tunnel between the eNB and a GERAN base station controller (BSC) serving the WTRU; and
receiving user data from the BSC via the tunnel;
wherein the handover request message includes a cell identifier (ID), an MME ID, and a tunneling endpoint ID (TEID).

2. The method of claim 1, further comprising:
receiving an attach signal from the WTRU; and
receiving a handover complete message from the WTRU.

3. The method of claim 2, further comprising:
communicating the handover complete message to the MME; and
in response to the handover complete message, terminating the tunnel.

4. The method of claim 3, further comprising:
in response to the termination of the tunnel, providing LTE services to the WTRU.

5. An evolved Node-B (eNB), the eNB comprising:
a receiver, configured to receive a handover request message from a Long Term Evolution (LTE) Mobility Management Entity (MME), the handover request message including an identifier of a wireless transmit/receive unit (WTRU) to be handed over from GSM EDGE Radio Access Network (GERAN) technology to LTE technology;
a processor, configured to establish radio resources for the WTRU based on the handover request message; and
a transmitter, configured to communicate a handover request acknowledgement message to the MME;
wherein the processor is further configured to establish a tunnel between the eNB and a GERAN base station controller (BSC) serving the WTRU;
wherein the receiver is further configured to receive user data from the BSC via the tunnel; and
wherein the handover request message includes a cell identifier (ID), an MME ID, and a tunneling endpoint ID (TEID).

6. The eNB of claim 5, wherein:
the processor is further configured to receive an attach signal from the WTRU; and the receiver is further configured to receive a handover complete message from the WTRU.

7. The eNB of claim 6, wherein:

the transmitter is further configured to communicate the handover complete message to the MME; and the processor is further configured, in response to the handover complete message, to terminate the tunnel.

8. The eNB of claim 7, wherein:

the receiver, transmitter, and processor are further configured, in response to the termination of the tunnel, to provide LTE services to the WTRU.

* * * * *